United States Patent
Hertz et al.

(10) Patent No.: US 8,736,205 B2
(45) Date of Patent: May 27, 2014

(54) SWITCHING DEVICE AND METHOD FOR TERMINATING A BRAKING PROCESS OF A THREE-PHASE AC MOTOR

(75) Inventors: Dirk Hertz, Fichtenhof (DE); Johann Seitz, Amberg (DE); Stefan Zitzler, Schwandorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/885,175

(22) PCT Filed: Nov. 17, 2010

(86) PCT No.: PCT/EP2010/067660
§ 371 (c)(1),
(2), (4) Date: May 14, 2013

(87) PCT Pub. No.: WO2012/065637
PCT Pub. Date: May 24, 2012

(65) Prior Publication Data
US 2013/0241450 A1    Sep. 19, 2013

(51) Int. Cl.
*H02P 3/22* (2006.01)
(52) U.S. Cl.
CPC .................................... *H02P 3/22* (2013.01)
USPC ............................ 318/379; 318/362; 318/375
(58) Field of Classification Search
CPC ........................................................ H02P 3/22
USPC ............................................ 318/379, 362, 375
See application file for complete search history.

(56) References Cited

U.S. PATENT DOCUMENTS

| 4,741,415 A | 5/1988 | Nomura |
| 4,908,563 A | 3/1990 | Suur-Askola |
| 5,825,154 A * | 10/1998 | Runggaldier et al. ........ 318/757 |

FOREIGN PATENT DOCUMENTS

| DE | 28 55 330 A1 | 7/1980 |
| DE | 38 16 449 A1 | 11/1988 |

OTHER PUBLICATIONS

International Search Report PCT/ISA/210 for PCT/EP2010/067660 dated Aug. 22, 2011.
Written Opinion PCT/ISA/237 for PCT/EP2010/067660.
International Preliminary Report on Patentability PCT/IPEA/409 for PCT/EP2010/067660 dated Mar. 20, 2013.

* cited by examiner

*Primary Examiner* — Bentsu Ro
*Assistant Examiner* — David Luo
(74) *Attorney, Agent, or Firm* — Harness, Dickey & Pierce, P.L.C.

(57) ABSTRACT

A switching device and method are disclosed for terminating a braking process of a three-phase AC motor. The braking process of the AC motor is performed by way of a first and second thyristor. During the braking process of the AC motor, in a first step the first thyristor is actuated in such a way that a braking current is fed to the AC motor, and therefore a torque which brakes the AC motor is produced. In a second step the second thyristor is actuated in such a way that, when the first thyristor is quenched, the braking current is taken on by the second thyristor and the braking torque is maintained. The two steps are repeated during the braking process; wherein the second step is suppressed during the braking process after a last actuation of the first thyristor.

18 Claims, 3 Drawing Sheets

SWITCHING DEVICE AND METHOD FOR TERMINATING A BRAKING PROCESS OF A THREE-PHASE AC MOTOR

PRIORITY STATEMENT

This application is the national phase under 35 U.S.C. §371 of PCT International Application No. PCT/EP2010/067660 which has an International filing date of Nov. 17, 2010, which designated the United States of America, the entire contents of each of which are hereby incorporated herein by reference.

FIELD

At least one embodiment of the invention generally relates to a switching device and/or to a method for terminating a braking process of a three-phase AC motor.

BACKGROUND

AC motors are frequently used for various drive purposes. These AC motors are started and in part also actively braked again by different mechanical or electronic switching devices. Typical applications of such combinations of starting and braking devices or devices which perform both functions are to found principally in the wood-working industry. Here, for safety reasons, there is a requirement to bring the in part considerable centrifugal masses of the machines, for example milling machines, planing machines and circular saws, to a complete stop within a certain time after switching off. This requirement can for the most part only be met by way of active braking.

Various methods are available for the active braking of AC motors. One frequently used method is DC braking. This can be performed inter alia by way of phase angle control using a thyristor circuit, wherein a pulsating direct current is applied to the AC motor for braking purposes from the three-phase power supply network. This method becomes particularly effective if the circuit contains a freewheeling circuit by way of which the braking current can continue to flow during the negative half wave of the driving voltage. In this case a braking current is injected into the motor with the aid of a first thyristor. At a zero crossing of the voltage present at the first thyristor the freewheeling circuit is closed by way of a second thyristor, which means that the AC motor continues to be braked. The braking of the AC motor is performed periodically by switching the two thyristors.

FIG. 3 shows the timing characteristics of a braking current 20 of an AC motor during the braking process thereof, wherein the AC is braked by way of a thyristor circuit having two thyristors. In this case, the braking current 20 is injected into the three-phase AC motor with the aid of a first thyristor. The timing of the actuation of the first thyristor is visualized by way of the first thyristor curve 22. In this case, the firings 23 of the first thyristor are plotted with respect to the braking current 20 present. Likewise, the timing of the actuation of the second thyristor is visualized by way of the second thyristor curve 21. In this case, the firings 24 of the second thyristor are likewise plotted with respect to the braking current 20 present. While the first and second thyristors are in the fired state 23,24 the respective thyristor is in a conducting state. A braking current is injected into the AC motor by way of the first thyristor while the first thyristor is in the fired state 23.

At a zero crossing of the voltage present at the first thyristor a freewheeling circuit is closed by way of the second thyristor, which means that a portion of the injected braking current continues to be delivered to the AC motor and thus continues braking the AC motor. The braking of the AC motor is performed periodically by switching the two thyristors. In order to terminate the braking process the first and subsequently the second thyristor are no longer fired.

After this point in time, the current continues to flow in the freewheeling circuit until the holding current of second thyristor is undershot. Until the holding current is undershot the second thyristor is conducting and bridges two motor windings of the AC motor, which means that a freewheeling circuit is present. A restart of the AC motor is thus not immediately possible because this would cause a short-circuit through the second thyristor (freewheeling thyristor).

Until the start of the AC motor, it is therefore necessary to observe a waiting time which must be guaranteed by way of a time interlock. Since the minimum waiting time depends on a plurality of parameters, such as AC motor, braking current and temperature for example, it must be designed with an adequate safety margin and can thus be up to several seconds.

A control device for switching on/off and braking an AC asynchronous motor by way of two thyristor switches is known from DE 28 55 330 A1. In order to brake the AC asynchronous motor by way of the thyristor switches, the thyristor switches are actuated for a predetermined braking time by way of a logic unit.

SUMMARY

An embodiment of the present invention is directed to an AC motor, designed to reduce the waiting time between the end of its braking process and a new possible motor start.

The braking process of the AC motor is in particular the period of time for the AC motor during which a braking current is present at the AC motor. The end of the braking process is in particular the point in time at which no braking current is present at the AC motor.

A method and a device are disclosed.

Advantageous developments of the invention are set down in the dependent claims.

In at least one embodiment of the invention, at the end of the braking process of the AC motor, the braking current goes to zero more quickly and a restart of the AC motor can thus be commenced earlier. As a result of the fact that the second thyristor does not take on the braking current after the last actuation of the first thyristor no freewheeling circuit of the braking current is formed and the braking current goes to zero more quickly. Since the braking current goes to zero more quickly the AC motor can also be released earlier for a restart without the risk of a short-circuit occurring.

The last actuation of the first thyristor is in particular a last actuation of the first thyristor within the braking process. After this last actuation of the first thyristor no further firing of the first thyristor takes place in respect of the braking process of the AC motor which has been performed.

When the first thyristor is quenched, in particular the zero crossing takes place of the voltage present across the first thyristor. In particular from this moment no braking current flows by way of the first thyristor to the AC motor. In order that the second thyristor is able to take on the braking current and a freewheeling circuit is thus produced the second thyristor in particular should be fired with effect from the zero crossing. In the second step, in which the second thyristor "takes on" the braking current and injects it again into the AC motor, a so-called freewheeling circuit is formed. The braking torque present at the AC motor can be maintained at least in part by this.

With regard to the switching device, the energy supply to the AC motor takes place by way of the AC motor lines and also the supply lines. Each phase of the three-phase AC motor and of the switching device comprises an AC motor line and a supply line which are, or can be, connected to one another in electrically conducting fashion.

During a braking process of the AC motor, the actuation of the second thyristor can be specifically suppressed by way of the processing unit when the last firing of the first thyristor takes place. This avoids a simultaneous firing of the second thyristor or a firing subsequent to the firing of the first thyristor resulting in a freewheeling circuit of the braking current. A freewheeling circuit of the braking current made possible by the thyristor is thus suppressed at the end of the braking process. The braking current in the first and second AC motor lines thus goes to zero more quickly.

The AC motor lines preferably each include an output-side connection device to which one phase of the AC motor can be connected. In addition, the supply lines preferably each include an input-side connection device to which one phase of a supply network can be connected.

In an advantageous embodiment of the invention, the braking process of the AC motor is performed by way of a switching device, wherein the switching device comprises a first, second and third AC motor line, a first and second supply line and the first and second thyristor, wherein the first, second and third AC motor lines are connected to the AC motor, wherein the first thyristor is connected to the first supply line and to the first AC motor line, the second thyristor is connected to the first AC motor line and to the second AC motor line and the second AC motor line is connected to the second supply line, wherein in the first step the first thyristor is actuated in such a manner that a braking current is injected into the AC motor by way of the first and second supply lines such that the torque which brakes the AC motor is produced. As a result of the fact that after the last firing of the first thyristor, and in particular after the last quenching of the first thyristor, no fired (conducting) second thyristor is present the formation of a freewheeling circuit is suppressed, which means that the current in the first and second AC motor lines goes to zero more quickly and an earlier restart of the AC motor is thus enabled.

The switching device can be designed to be inside or outside the AC motor. The first thyristor is preferably conducting for a preset current or a preset time slot. In the non-conducting state the current flow, up to the end of the braking process, is maintained during the braking process by the fired conducting second thyristor. As soon as the first thyristor is actuated again and thus becomes conducting, a braking current is again injected from the first supply line into the AC motor. This process is preferably repeated several times. When the last firing of the first thyristor occurs, a simultaneous or subsequent actuation of the second thyristor is suppressed. The second thyristor is consequently no longer switched into a conducting state. It thus pauses the non-conducting state, which means that the current in the first and second AC motor lines and thus in the AC motor goes to zero more quickly.

During the braking process the third AC motor line is preferably not connected in electrically conducting fashion to a supply line. In particular, no current flow is present inside the third AC motor line during the braking process. The actuation of the first and second thyristors is preferably effected by a processing unit. The processing unit controls in particular the point in time of actuation of the first and second thyristors.

The first thyristor is preferably connected on the input side to the first supply line and on the output side to the first AC motor line. The second thyristor is preferably connected on the input side to the second AC motor line and on the output side to the first AC motor line.

By preference, the first and second thyristors each lie with their cathode or each with their anode against the first AC motor line.

The first and second steps are repeated during the braking process, in each case preferably within a period when the voltage is present at the first thyristor, at least once. By preference, both steps are repeated continuously within a braking process up until the last actuation of the first thyristor.

In a further advantageous embodiment of the invention, the actuation of the first and/or second thyristor is effected in each case for a preset time slot or a preset current. In particular, the period of time in which the first and/or second thyristor is fired and is thus conducting is defined by the time slot or the current. In this manner, the braking current can be specifically injected into the AC motor by way of the first thyristor or through the second thyristor by way of the freewheeling circuit such that a torque which brakes the AC motor is produced.

In a further advantageous embodiment of the invention, the first and second steps each take place within a period when current is lying across the first thyristor. The firing of the thyristors thus takes place within a period of current and is preferably performed repeatedly for each period during the braking process (up to the last firing of the first thyristor). In particular, the firing of the second thyristor takes place during the zero crossing of the current present across the first thyristor or of the voltage present across the first thyristor.

In a further advantageous embodiment of the invention, the firing of the second thyristor takes place simultaneously with the firing of the first thyristor. In this case, the firing of the thyristors in particular is what is meant by actuation.

In a further advantageous embodiment of the invention, during the braking process of the AC motor, the processing unit is furthermore designed so as to:

in a first step, actuate the first thyristor in such a manner that a braking current is injected into the AC motor by way of the first and second supply lines such that a torque which brakes the AC motor is produced, in a second step, actuate the second thyristor in such a manner that when the first thyristor is quenched the braking current is taken on by the second thyristor such that the braking torque is maintained, repeat the two steps.

In particular, after a last actuation of the first thyristor, the processing unit serves to prevent the second step from taking place and a freewheeling circuit of the braking current from being formed. The braking torque produced by the first thyristor is at least partially maintained by the freewheeling circuit.

In the first step, the first thyristor is fired, with the result that a braking current is injected into the AC motor by way of the first and second supply lines and a torque which brakes the AC motor is produced. In the second step, the second thyristor is actuated such that when the first thyristor is quenched the braking current is taken on by the second thyristor, which means that the braking torque is at least partially maintained. This process is preferably repeated at least once during the braking process. By preference, the two steps are performed periodically in respect of the current present at the first thyristor up to the last firing of the first thyristor. In the case of the last firing of the first thyristor during the braking process of the AC motor the simultaneous or subsequent firing of the second thyristor is suppressed, with the result that no freewheeling circuit is formed. This means that the current in the first and second AC motor lines goes to zero more quickly.

In a further advantageous embodiment of the invention the first and second thyristors each lie with their cathode or each with their anode against the first AC motor line.

In a further advantageous embodiment of the invention, the third AC motor line is connected to the first or third supply line.

In a further advantageous embodiment of the invention, the first supply line includes a first switching element, wherein the first thyristor is connected to the first supply line in such a manner that when the first switching element is in the open state a current can flow across the first thyristor. The first switching element comprises in particular two opposed thyristors. Furthermore, the first switching element can preferably be bridged by way of a second switching element.

In a further advantageous embodiment of the invention, the third AC motor line is connected to the first switching element.

In a further advantageous embodiment of the invention, the second thyristor and/or first thyristor can be actuated for a preset time slot. The actuation is preferably performed by the processing unit.

In a further advantageous embodiment of the invention, the third AC motor line is connected to the first supply line and the second supply line includes a third switching element, in particular two opposed thyristors. By preference, a commutating choke is connected upstream of the first thyristor. The commutation of the braking current between the two thyristors is preferably performed periodically with the aid of the commutating choke.

In a further advantageous embodiment of the invention, the second supply line includes a third switching element, in particular two opposed thyristors. The third switching element can preferably be bridged by way of a fourth switching element. The second AC motor line preferably includes a fifth switching element with which the current flow within the line can be interrupted.

BRIEF DESCRIPTION OF THE DRAWINGS

The invention and embodiments of the invention will be described and explained in detail in the following with reference to the example embodiments illustrated in the figures. In the drawings.

DETAILED DESCRIPTION OF THE EXAMPLE EMBODIMENTS

Figure 1:
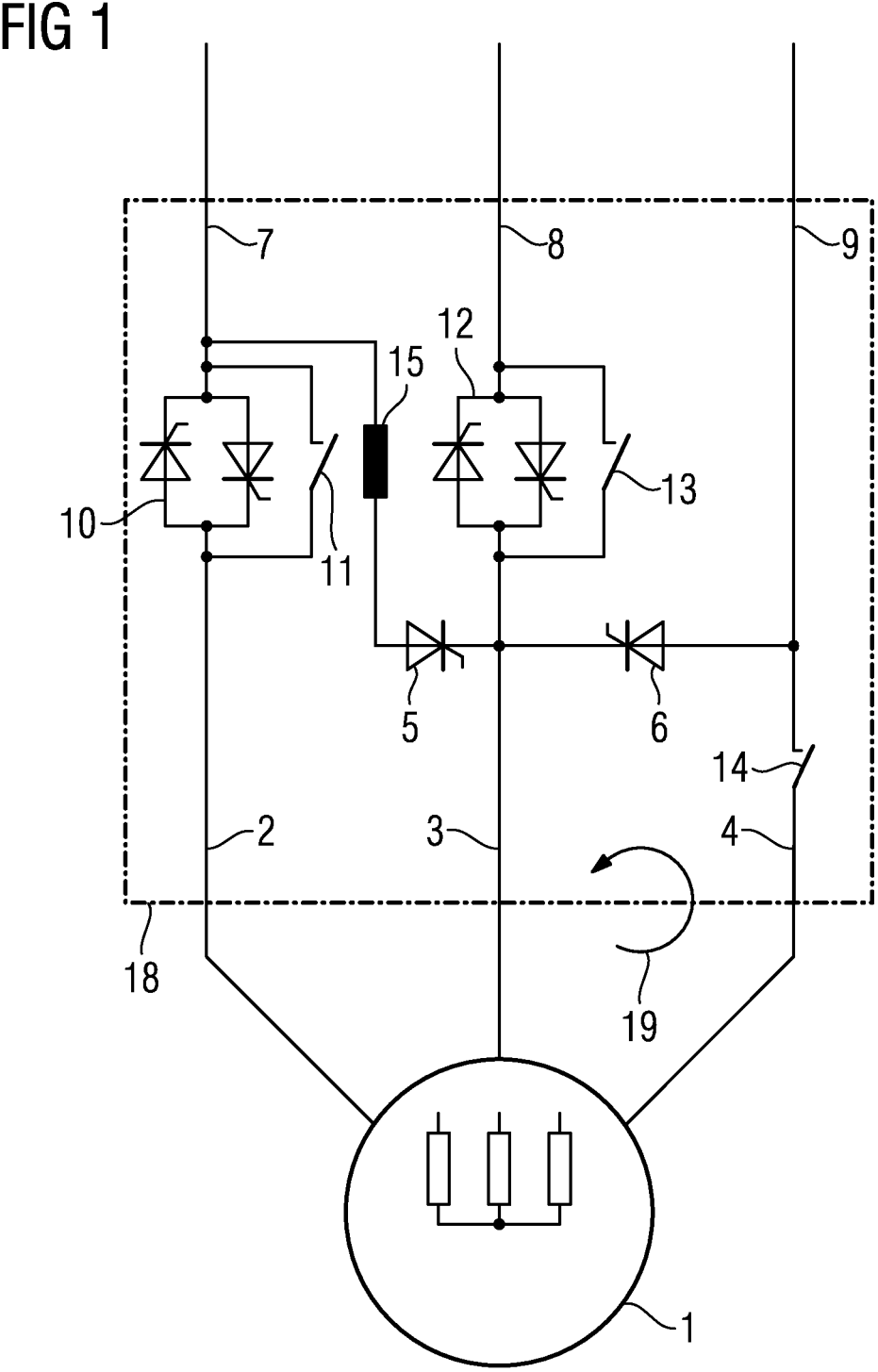
FIG. 1 shows a schematic illustration of a first switching device for terminating a braking process of a three-phase AC motor.

FIG. 1 shows a schematic illustration of a first switching device 18 for terminating a braking process of a three-phase AC motor 1. The switching device 18 is connected to the individual phases of the three-phase AC motor 1 in electrically conducting fashion. The switching device 18 has a supply line 7,8,9 and an AC motor line 2,3,4 for each phase. The supply lines 7,8,9 are arranged on the input side on the switching device 18 and are facing a supply network and preferably each have connection device(s) such that a connection to the supply network can be effected by way of external lines. The individual AC motor lines 2,3,4 are arranged on the output side on the switching device 18 and are facing the AC motor 1. Since the switching device 18 is arranged outside the AC motor 1, the AC motor lines 2,3,4 each have connection device(s) such that a connection to the associated AC motor lines 2,3,4 can be effected by way of external lines for each phase of the AC motor 1.

In normal operation, the AC motor 1 is supplied with energy from the supply network by way of the individual phases of the switching device, thereby enabling the AC motor 1 to be operated.

In its first phase the switching device 18 has a first supply line 7, a first switching element 10 and a third AC motor line 2. The first switching element 10 is connected on the input side to the first supply line 7. On the output side the third AC motor line 2 is connected to the first switching element 10. Said third AC motor line 2 is finally connected to a first phase of the AC motor 1. The first switching element 10 comprises two opposed thyristors and can be bridged by way of a second switching element 11.

The second phase of the switching device 18 comprises a second supply line 8, a third switching element 12, a fourth switching element 13, and a first AC motor line 3. The third switching element 12, which comprises two opposed thyristors, is connected on the input side to the second supply line 8. On the output side the third switching element 12 is connected to the first AC motor line 3. The third switching element 12 can be bridged by way of a fourth switching element 13. The first AC motor line 3 is connected to a second phase of the AC motor 1.

The third phase of the switching device 18 comprises a third supply line 9, a fifth switching element 14 and a second AC motor line 4. The third supply line 9 is connected to the second AC motor line 4 in electrically conducting fashion. The second AC motor line 4 includes the fifth switching element 14, by which the second AC motor line 4 can be opened or closed. The fifth switching element 14 is closed during the braking process of the AC motor 1, which means that an electrically conducting connection is present.

The switching device 18 furthermore includes a first thyristor 5 and a second thyristor 6. The first thyristor 5 is connected on the input side to the first supply line 7. In this case, a commutating choke 15 is interposed. On the output side the first thyristor 5 is connected to the first AC motor line 3. The second thyristor 6 is connected on the input side to the second AC motor line 4. On the output side the second thyristor 6 is connected to the first AC motor line 3. During a braking process of the AC motor 1 the first switching element 10, the second switching element 11, the third switching element 12 and the fourth switching element 13 are open.

By way of a processing unit, which is not illustrated, the first and second thyristors 5,6 can be actuated in such a manner that a braking current can be injected into the AC motor 1 such that a braking torque is produced for the AC motor. Such an actuation is shown for example in FIG. 4. In this case, the first thyristor 5 is firstly fired such that a current, in this case a braking current, is injected into the AC motor 1 by way of the first supply line 7 and the first AC motor line 3. The third phase in this case likewise exhibits a conducting state.

As soon as the current curve of the current present on the first supply line 7 has crossed zero from the positive half wave, the first thyristor is quenched and the braking current injected into the AC motor 1 would terminate. However, in order to at least partially further maintain the torque braking the AC motor 1, the second thyristor 6 is either fired simultaneously with the firing of the first thyristor 5 or however at the latest prior to the zero crossing of the current curve at the first thyristor 5. The second thyristor 6 can thus tap the braking current present at the AC motor 1 by way of the second AC motor line 4 and deliver it again to the AC motor 1 by way of the first AC motor line 3. A so-called freewheeling circuit 19 is formed.

Only when the first thyristor 5 is fired again is a braking current delivered once again to the AC motor 1 by way of the first supply line 7. Control of the firing times of the first and second thyristors 5,6 is effected by the processing unit such that an optimum braking torque is present at the AC motor 1. The process of firing the first thyristor 5 and the second thyristor 6 is performed repeatedly, with the result that the AC motor 1 is braked gradually.

In order to bring about as rapid a termination as possible of the braking process of the AC motor 1 at the end of the braking process, after a last actuation of the first thyristor 5 the second thyristor 6 will no longer be actuated, which means that a freewheeling circuit 19 is suppressed. This causes the braking current at the AC motor 1 to go suddenly to zero. If the second thyristor 6 were to be fired however, then the braking current would fall slowly until the braking current in the freewheeling circuit 19 undershoots the holding current of the second thyristor 6. This process can however take several seconds.

For a restart of the motor, there may however be no freewheeling circuit 19 present since a restart of the AC motor 1 and thus a closure of the first and third switching elements 10,13 would result in a short-circuit through the second thyristor. Up until the motor started, it would therefore be necessary to observe a waiting time which ensures that no freewheeling circuit 19 is present. As a result of the fact that after the last actuation of the first thyristor 5 no firing of the second thyristor 6 occurs and thus no freewheeling circuit 19 is produced it is possible to ensure that the braking current suddenly goes to zero and a restart of the AC motor 1 is thus enabled immediately after the first thyristor 5 is quenched.

Figure 2:
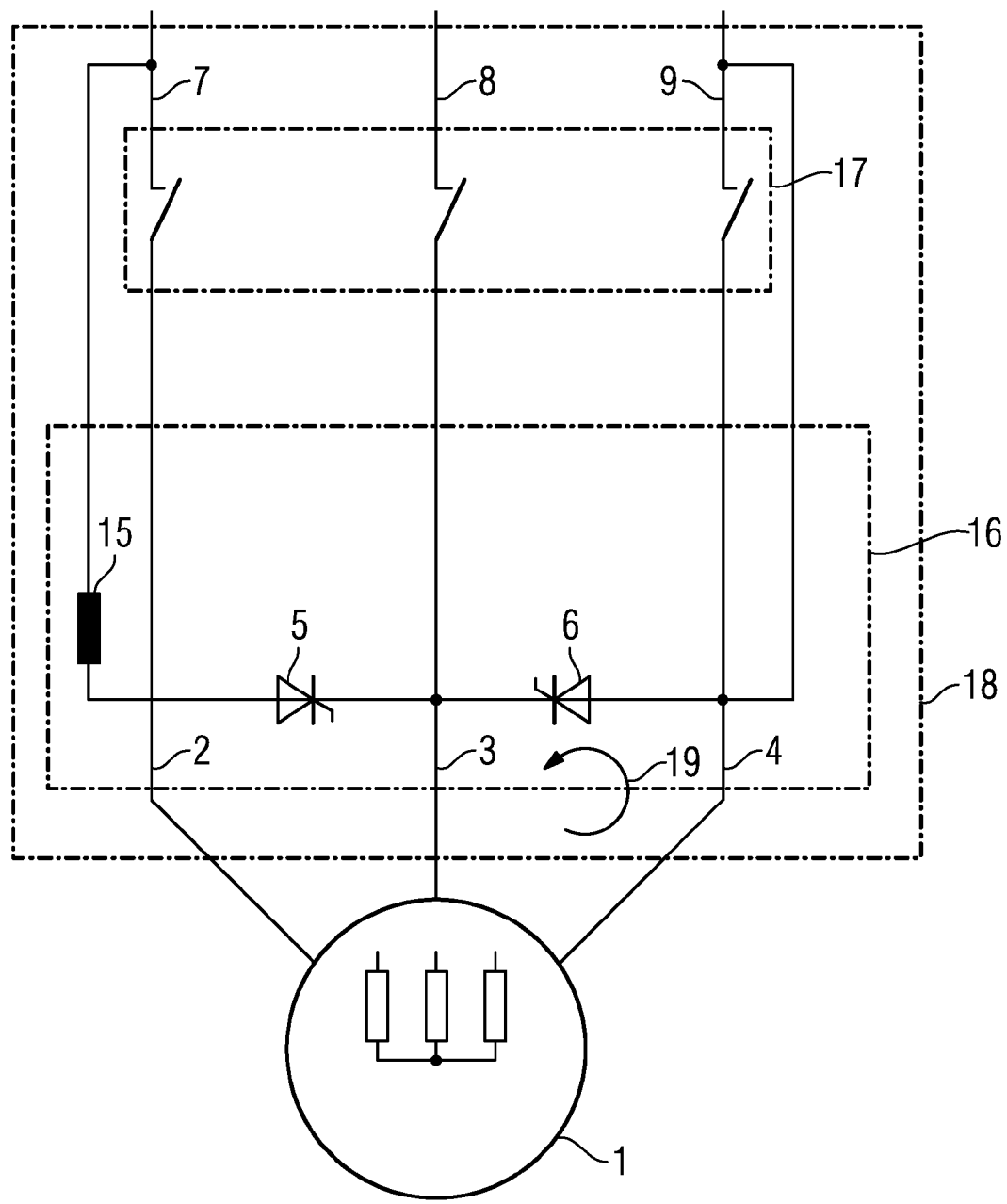
FIG. 2 shows a schematic illustration of a second switching device for terminating a braking process of a three-phase AC motor.

FIG. 2 shows a schematic illustration of a second switching device 18 for terminating a braking process of a three-phase AC motor 1. In this case the switching device 18 comprises a switching device unit 17 for the startup function of the AC motor 1, a switching device unit 16 for the braking function of the AC motor 1, a first, second, third supply line 7,8,9 and a first, second, third AC motor line 2,3,4. The switching device unit 17 is used for restarting the AC motor 1 connected to the switching device 18. The individual phases can be opened or closed by way of individual switching elements within the switching device unit 17.

The switching device unit 16 includes a commutating choke 15 which is connected to the first supply line 7 above the switching device unit 17. Furthermore, a first thyristor 5 is connected on the input side to the commutating choke 15 and on the output side to the first AC motor line 3. A second thyristor 6 is connected on the input side to the second AC motor line 4 and on the output side to the first AC motor line 3. The commutating choke 15, the first thyristor 5 and second thyristor 6 are components of the switching device unit 16.

A braking current can be injected into the AC motor 1 through specific actuation of the first thyristor 5. The braking current can be maintained within the AC motor 1 by way of the second thyristor 6, such that a freewheeling circuit 19 is produced. In this manner a braking current can be delivered to the AC motor 1 over an extended period such that a torque which brakes the AC motor 1 is produced. In order that a rapid restart of the AC motor 1 can take place at the end of the braking process, no actuation of the second thyristor 6 takes place during the braking process after a last actuation of the first thyristor 5, which means that a freewheeling circuit 19 is suppressed. The braking current consequently rapidly goes to zero.

Figure 3:
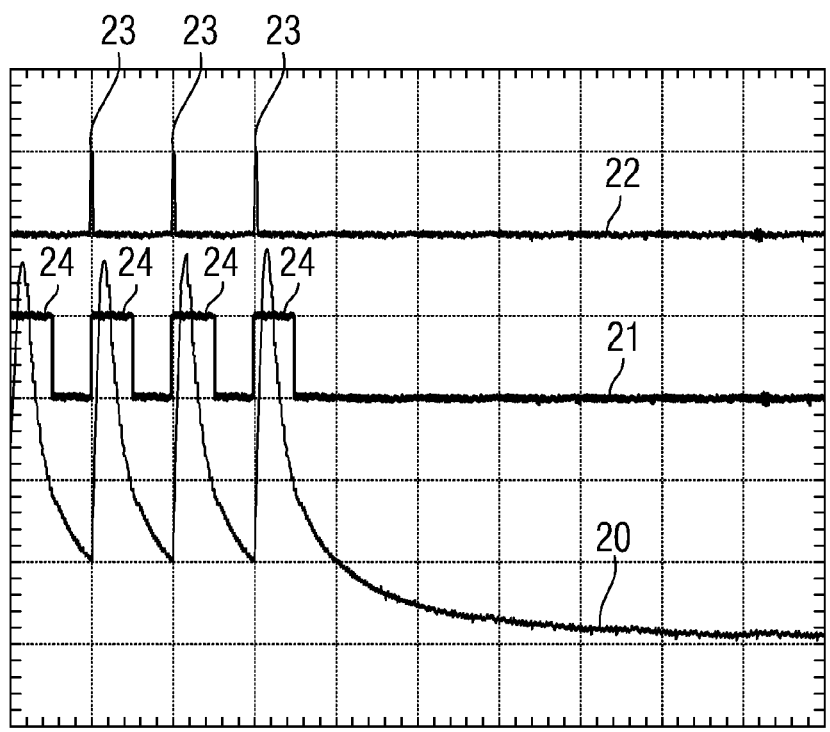
FIG. 3 shows the timing characteristics of a braking current of an AC motor during the braking process thereof, wherein the AC motor is braked by way of a thyristor circuit having two thyristors.

FIG. 3 shows the timing characteristics of a braking current 20 of an AC motor during the braking process thereof, wherein the AC motor is braked by way of a thyristor circuit having two thyristors. The timing of the actuation of the first thyristor is visualized by way of the first thyristor curve 22. In this case, the firings 23 of the first thyristor are plotted with respect to the braking current 20 present. Likewise, the timing of the actuation of the second thyristor is visualized by way of the second thyristor curve 21. In this case, the firings 25 of the second thyristor are likewise plotted with respect to the braking current 20 present.

The braking current 20 is injected into the AC motor from the supply line by way of the first thyristor. The injected braking current 20 is "picked up" by way of the second thyristor and delivered again to the AC motor. It can be seen that after a last firing 23 of the first thyristor a firing 24 of the second thyristor 6 takes place. After this point in time the braking current 20 continues flowing in the freewheeling circuit until the holding current of the second thyristor is undershot. During this time the second thyristor is conducting and bridges two motor windings. The braking current 20 thus falls gradually until the holding current at the second thyristor is undershot. Depending on the design of the second thyristor, this process can last several seconds.

For a restart of the AC motor it is however necessary to ensure that no freewheeling circuit and thus no conducting state is present at the second thyristor since this would cause a short-circuit through the second thyristor. Until the restart of the AC motor it is therefore necessary to observe a waiting time which must be guaranteed by way of a time interlock. It is consequently necessary after the last firing 23,24 of the first and second thyristors to force a waiting time in order to avoid a short-circuit at the second thyristor.

Figure 4:
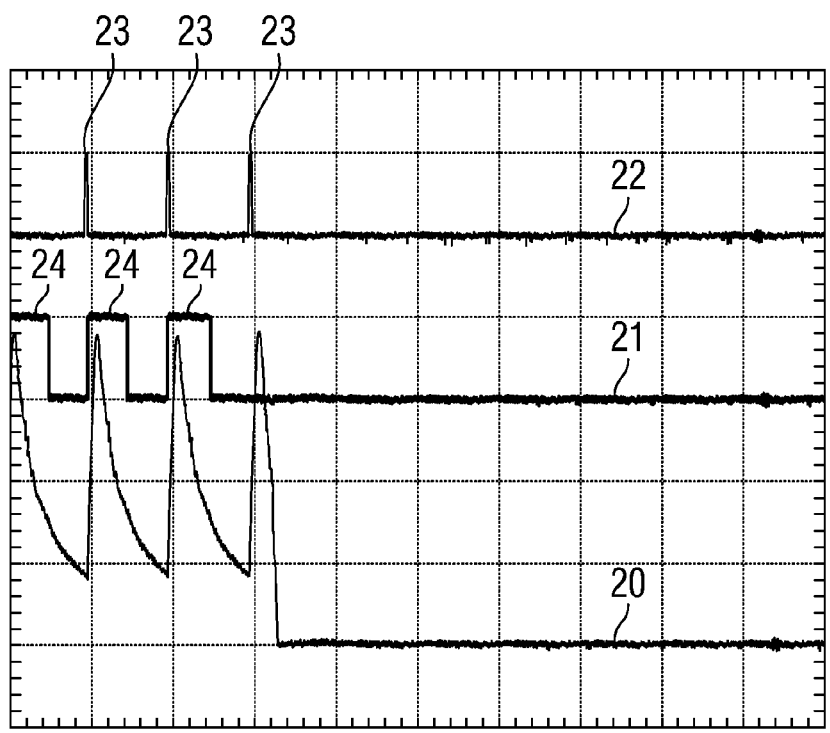
FIG. 4 shows the timing characteristics of a braking current of an AC motor during the braking process thereof, wherein the AC motor is braked by way of a switching device according to FIG. 1 or FIG. 2.

FIG. 4 shows the timing characteristics of a braking current 20 of an AC motor during the braking process thereof, wherein the AC motor is braked by way of a switching device according to FIG. 1 or FIG. 2. In comparison with FIG. 3, no firing of the second thyristor takes place in this case after a last firing 23 of the first thyristor. The braking current 20 consequently rapidly goes to zero so that a restart of the AC motor can take place. In comparison with a braking process according to FIG. 3, a quicker restart of the AC motor can thus take place without there being any danger of a short-circuit. In FIG. 4, three firings 23 of the first thyristor 5 and three firings 24 of the second thyristor 6 are illustrated. In FIG. 3, three firings 23 of the first thyristor and four firings 24 of the second thyristor are illustrated. A conducting state is present at the respective thyristor during the firing 23, 24.

The invention claimed is:

1. A method for terminating a braking process of a three-phase AC motor, wherein the braking process of the AC motor is performed by way of a switching device, wherein the switching device includes a first, second and third AC motor line, a first and third supply line and a first and second thyristor, wherein the first, second and third AC motor lines are connected to the AC motor, wherein the first thyristor is connected to the first supply line and to the first AC motor line, the second thyristor is connected to the first AC motor line and to the second AC motor line, and the second AC motor line is connected to the third supply line, wherein the actuation of the first and second thyristors is performed by a processing unit of the switching device, wherein during the braking process of the AC motor, the method comprising:

actuating, via the processing unit, the first thyristor in such a manner that a braking current is injected into the AC motor by way of the first and third supply lines such that a torque which brakes the AC motor is produced;

actuating, via the processing unit, the second thyristor in such a manner that when the first thyristor is quenched, the braking current is taken on by the second thyristor and the braking torque is maintained;

repeating, via the processing unit, the actuating of the first and second thyristor; and suppressing, at the end of the braking process of the AC motor and via the processing unit, an actuation of the second thyristor after a last actuation of the first thyristor so that the second thyristor does not take on the braking current.

2. The method of claim 1, wherein the actuation of at least one of the first and second thyristor is effected, in each case, for a preset time slot or a preset current.

3. The method of claim 1, wherein the actuating of the first and second thyristors take place within a period when current is lying across the first thyristor.

4. The method of claim 2, wherein the actuating of the first and second thyristors take place within a period when current is lying across the first thyristor.

5. A switching device for terminating a braking process of a three-phase AC motor, wherein the switching device comprising:

a first, second and third AC motor line;
a first and third supply line; and
a first and second thyristor, wherein the first, second and third AC motor lines are connectable to the AC motor, wherein the first thyristor is connected to the first supply line and to the first AC motor line, the second thyristor is connected to the first AC motor line and to the second AC motor line, and the second AC motor line is connected to the third supply line; and a processing unit, configured to actuate the first and second thyristors, wherein the processing unit is furthermore configured, during the braking process of the AC motor, at least to:

actuate, in a first steps the first thyristor in such a manner that a braking current is injected into the AC motor by way of the first and third supply lines such that a torque which brakes the AC motor is produced, actuate, in a second step, the second thyristor in such a manner that, when the first thyristor is quenched, the braking current is taken on by the second thyristor and the braking torque is maintained, repeats the first and second steps, the processing unit further being configured to, at the end of the braking process of the AC motor, suppress an actuation of the second thyristor after a last actuation of the first thyristor so that the second thyristor does not take on the braking current.

6. The switching device of claim 5, wherein the first and second thyristors each respectively lie with a respective cathode or anode against the first AC motor line.

7. The switching device of claim 6, wherein the third AC motor line is connected to the first supply line.

8. The switching device of claim 6, wherein at least one of the second thyristor and the first thyristor are actuatable for a preset time slot.

9. The switching device of claim 6, wherein the first supply line includes a first switching element, wherein the first thyristor is connected to the first supply line in such a manner that when the first switching element is in the open state, a current can flow across the first thyristor.

10. The switching device of claim 6, wherein the third AC motor line is connected to the first supply line and the second supply line includes a third switching element.

11. The switching device of claim 5, wherein the third AC motor line is connected to the first supply line.

12. The switching device of claim 11, wherein at least one of the second thyristor and the first thyristor are actuatable for a preset time slot.

13. The switching device of claim 11, wherein the first supply line includes a first switching element, wherein the first thyristor is connected to the first supply line in such a manner that when the first switching element is in the open state, a current can flow across the first thyristor.

14. The switching device of claim 11, wherein the third AC motor line is connected to the first supply line and the second supply line includes a third switching element.

15. The switching device of claim 5, wherein at least one of the second thyristor the first thyristor are actuatable for a preset time slot.

16. The switching device of claim 5, wherein the first supply line includes a first switching element, wherein the first thyristor is connected to the first supply line in such a manner that when the first switching element is in the open state, a current can flow across the first thyristor.

17. The switching device of claim 5, wherein the third AC motor line is connected to the first supply line and the second supply line includes a third switching element.

18. The switching device of claim 17, wherein the second supply line includes two opposed thyristors as the third switching element.

* * * * *